United States Patent [19]
Lee et al.

[11] Patent Number: 5,550,850
[45] Date of Patent: Aug. 27, 1996

[54] APPARATUS AND METHOD FOR PRECISELY WAVELENGTH-TUNING SINGLE LONGITUDINAL MODE TUNABLE LASER BEAMS BY UTILIZING WEDGE PRISM

[75] Inventors: Jong-Min Lee; Byung-Heon Cha; Sung-Ho Kim; Do-Kyeong Ko, all of Daejeon, Rep. of Korea

[73] Assignees: Korea Atomic Energy Research Institute, Daejeon; Korea Electric Power Corporation, Seoul, both of Rep. of Korea

[21] Appl. No.: 385,429

[22] Filed: Feb. 8, 1995

[30] Foreign Application Priority Data

Mar. 22, 1994 [KR] Rep. of Korea .................... 94-5726

[51] Int. Cl.⁶ .................................................. H01S 3/11
[52] U.S. Cl. .................... 372/16; 372/20; 372/102; 372/54; 372/100
[58] Field of Search ...................... 372/16, 20, 102, 372/54, 100

[56] References Cited

U.S. PATENT DOCUMENTS

| | | | |
|---|---|---|---|
| 4,229,710 | 10/1980 | Shosan | 372/20 |
| 4,399,540 | 8/1983 | Buecher | 372/100 |
| 5,054,028 | 10/1991 | Esherick et al. | 372/102 |
| 5,081,630 | 1/1992 | Lowenthal et al. | 372/102 |
| 5,136,596 | 8/1992 | Rao et al. | 372/20 |
| 5,216,679 | 6/1993 | Tamura et al. | 372/102 |
| 5,319,668 | 6/1994 | Luecke | 372/20 |
| 5,325,378 | 6/1994 | Zorabedian | 372/20 |
| 5,379,310 | 1/1995 | Papen et al. | 372/102 |

*Primary Examiner*—Leon Scott, Jr.
*Attorney, Agent, or Firm*—Nikaido Marmelstein Murray & Oram LLP

[57] ABSTRACT

An apparatus and a method for precisely wavelength-tuning single longitudinal mode tunable laser beams by utilizing a wedge prism are disclosed in which, instead of a tuning mirror, a prism is rotated, so that a single longitudinal mode can be maintained without causing a mode hopping of the longitudinal mode, thereby precisely tuning the wavelength. That is, a wedge prism 4 is inserted into the single longitudinal mode tunable laser resonator, and the prism is rotated, thereby precisely tuning the wavelength of the laser beams.

2 Claims, 1 Drawing Sheet

APPARATUS AND METHOD FOR PRECISELY WAVELENGTH-TUNING SINGLE LONGITUDINAL MODE TUNABLE LASER BEAMS BY UTILIZING WEDGE PRISM

FIELD OF THE INVENTION

The present invention relates to an apparatus and a method for precisely wavelength-tuning single longitudinal mode tunable laser beams by utilizing a wedge prism, in which, instead of a tuning mirror, a prism is rotated, so that a single longitudinal mode can be continuously maintained without causing a mode hopping of the longitudinal mode, thereby precisely tuning the wavelength.

BACKGROUND OF THE INVENTION

FIG. 1 illustrates a single longitudinal mode tunable laser resonator with a prism inserted. The conventional method forms a resonator by including a wholly reflecting mirror 1, a laser gain medium 2 and a grating 3, and by shifting the wavelength. Among the beams which are diffracted by the grating 3, the beams which are incident perpendicularly to a tuning mirror 5 to be reflected are made to return to be amplified, thereby realizing laser oscillations.

In this case, the diffraction angles of the grating 3 are variously different depending on the wavelength. Therefore, the tuning mirror 5 is rotated, so that the wavelength of the beams perpendicularly reflected from the tuning mirror 5 would become different, thereby shifting the wavelength.

SUMMARY OF THE INVENTION

The object of the present invention is to provide an apparatus and a method for precisely wavelength-tuning single longitudinal mode tunable laser beams by utilizing a wedge prism, in which, instead of a tuning mirror, a prism is rotated, so that a single longitudinal mode can be continuously maintained without causing a mode hopping of the longitudinal mode, thereby precisely tuning the wavelength.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
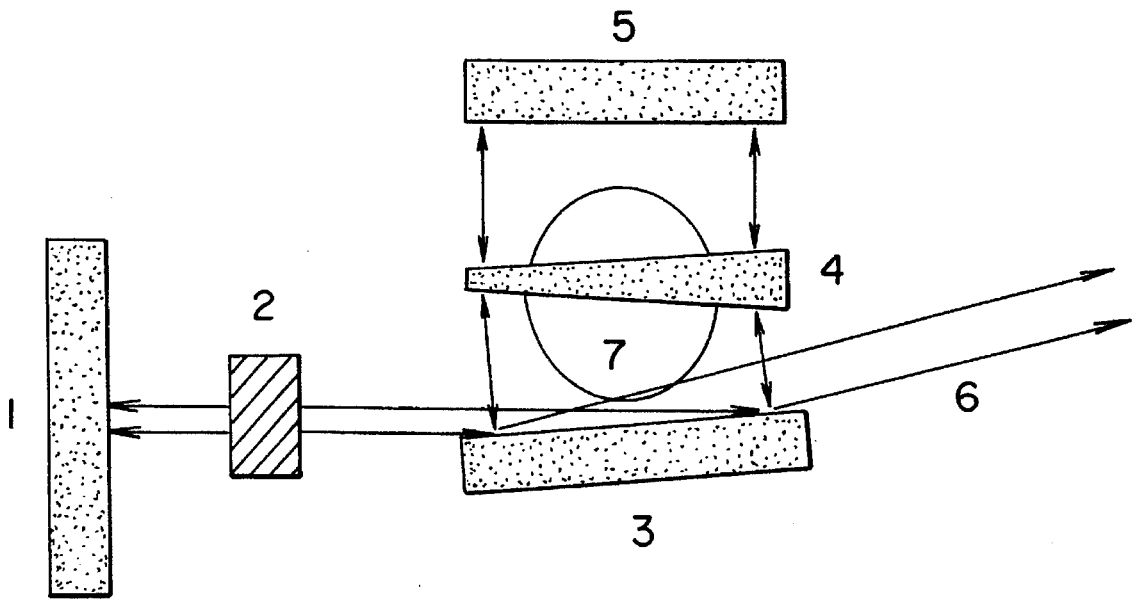
FIG. 1 is a schematic view of a single longitudinal mode tunable laser resonator with a prism inserted.
Figure 2:
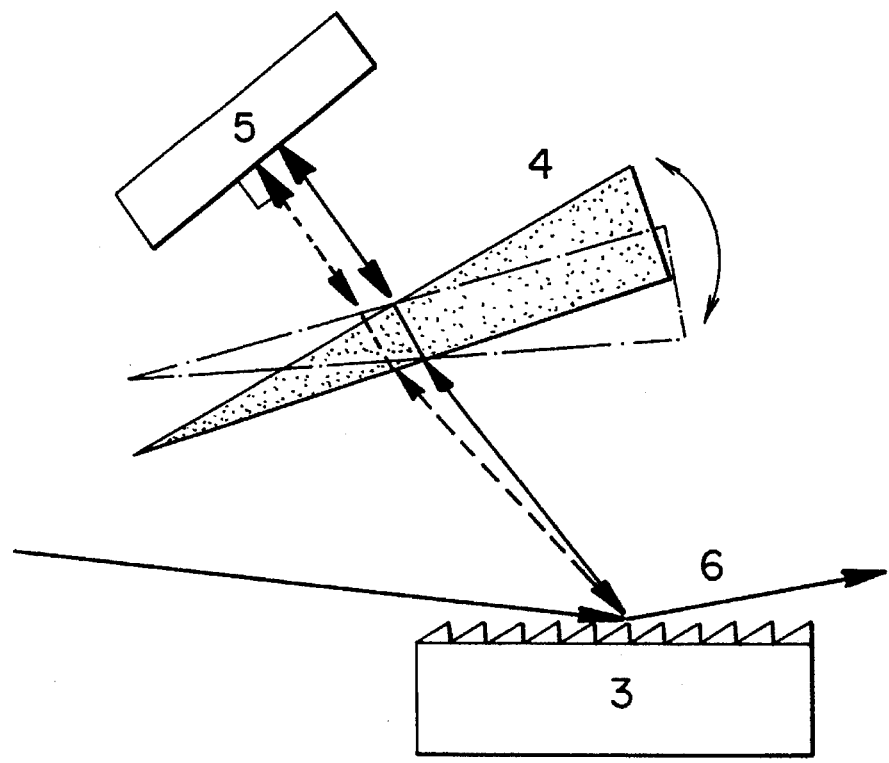
FIG. 2 illustrates the principle of precisely tuning the wavelength by utilizing a wedge prism.

The present invention is constituted such that a wedge prism 4 is inserted into between a grating 3 and a tuning mirror 5, and the prism 4 is rotated by means of a rotating stage 7. Thus as shown in FIG. 2, the travel direction of the beams is refracted, so that the same effect as rotating the tuning mirror 5 can be obtained.

Meanwhile, in the case where the tuning mirror 5 is rotated, the wavelength shifting ratio is very large (10,000 GHz per one degree rotation).

However, if the wedge prism 4 is used, the wavelength shifting ratio can be drastically reduced. For example, if it is assumed that the apex angle of the prism is 2 degrees and its thickness is 3 mm, and that the length of the laser resonator is 11.4 cm, then a wavelength adjustment of 40 GHz per one degree rotation is possible. This implies that the precision is improved by 250 times that of the conventional method.

There is the requirement that the wavelength shifting should be possible without a mode hopping in the single longitudinal mode. The mode hopping can be eliminated over a sufficient area by adjusting the position of the prism.

Under the above assumption, if the prism is disposed at 2 cm above the grating, a shifting of 200 GHz can be achieved without a mode hopping. Further, if the length of the resonator and the position of the prism are adjusted, the range of the wavelength shifting and its ratio can be varied.

According to the present invention, a precise wavelength tuning is possible, and it can be put to a practical application in the field of the laser industry.

What is claimed is:

1. A method for precisely tuning the wavelength of a single longitudinal mode turntable laser, comprising the steps of:

inserting a wedge prism on a rotating stage between a grating and a tuning mirror;

rotating the rotating stage and prism to precisely tune a desired wavelength.

2. An apparatus for precisely tuning the wavelength of a single longitudinal mode tunable laser comprising:

a grating;

a tuning mirror;

a prism;

a rotating stage, wherein aid prism is disposed on said rotating stage; and wherein said prism is disposed between said grating and said tuning mirror such that said rotating stage is capable of rotating said prism for precisely tuning a desired wavelength.

* * * * *